US011270063B1

(12) United States Patent
Bauer et al.

(10) Patent No.: US 11,270,063 B1
(45) Date of Patent: Mar. 8, 2022

(54) METHODS AND SYSTEMS FOR INTERACTIVE DATA INPUT

(71) Applicant: CITIBANK, N.A., New York, NY (US)

(72) Inventors: Dale Bauer, Naperville, IL (US); Matthew Bills, Chicago, IL (US); Dante Diaz, Frisco, TX (US); Kristi M. Emery, Coppell, TX (US); David Hyser, Wilmette, IL (US); Michael Brandt, New York, NY (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 16/932,051

(22) Filed: Jul. 17, 2020

(51) Int. Cl.
*G06F 40/174* (2020.01)
*H04L 51/046* (2022.01)
*G06F 3/0481* (2022.01)
*G06F 16/958* (2019.01)
*G06F 9/451* (2018.01)
*G06F 3/04895* (2022.01)
*G06F 3/04812* (2022.01)

(52) U.S. Cl.
CPC .......... *G06F 40/174* (2020.01); *G06F 3/0481* (2013.01); *G06F 3/04812* (2013.01); *G06F 3/04895* (2013.01); *G06F 9/453* (2018.02); *G06F 16/958* (2019.01); *H04L 51/046* (2013.01)

(58) Field of Classification Search
CPC .......................... G06F 3/048–05; G06F 40/174
See application file for complete search history.

(56) References Cited

U.S. PATENT DOCUMENTS

| 6,393,423 | B1* | 5/2002 | Goedken | G06F 16/951 |
| 10,795,640 | B1* | 10/2020 | Knight | G06F 3/0487 |
| 10,853,563 | B1* | 12/2020 | Chen | G06F 16/2228 |
| 2008/0098291 | A1* | 4/2008 | Bradley | G06F 40/117 |
| | | | | 715/223 |

(Continued)

OTHER PUBLICATIONS

Shekman Tang, "The cult of conversational design: why forms aren't dead yet", published Oct. 11, 2017, available at <<https://www.intercom.com/blog/why-forms-arent-dead-yet/>>, 12 pages (Year: 2017).*

(Continued)

*Primary Examiner* — Daniel Rodriguez
(74) *Attorney, Agent, or Firm* — Foley & Lardner LLP

(57) ABSTRACT

Described herein are methods and systems to generate and display interactive graphical user interfaces that receive data inputs from users while emulating a chat session. A server retrieves a set of prompts associated with an electronic form; displays, within a webpage, a first element corresponding to a prompt and a second element having at least one input element configured to receive an input from a user interacting with the webpage. When the user interacts with an input element, the server relocates the first element and dynamically revises the second element by relocating the second element and displaying inputted values received from the user interacting with the at least one input element of the second element. The server then displays a third element comprising next prompts of the electronic form.

20 Claims, 11 Drawing Sheets

(56) References Cited

U.S. PATENT DOCUMENTS

| | | | | |
|---|---|---|---|---|
| 2012/0288845 | A1* | 11/2012 | Kumar GL | G09B 7/06 |
| | | | | 434/362 |
| 2017/0192950 | A1* | 7/2017 | Gaither | G06F 3/0484 |
| 2018/0234367 | A1* | 8/2018 | Lange | H04L 51/08 |
| 2018/0331979 | A1* | 11/2018 | Rakovitsky | H04L 51/046 |
| 2020/0044998 | A1* | 2/2020 | Jeon | G06Q 30/0252 |
| 2020/0218766 | A1* | 7/2020 | Yaseen | G06F 16/252 |
| 2020/0341604 | A1* | 10/2020 | Hewitt | G06N 5/043 |
| 2020/0342032 | A1* | 10/2020 | Subramaniam | G10L 15/063 |

OTHER PUBLICATIONS

Space10, "Turn you content into conversations", available at <<https://space10-community.github.io/conversational-form/landing-page/>>, archived on Mar. 25, 2020 at wayback machine: <<https://web.archive.org>>, 6 pages (Year: 2020).*

* cited by examiner

METHODS AND SYSTEMS FOR INTERACTIVE DATA INPUT

TECHNICAL FIELD

This application relates generally to interactive/dynamic graphical user interfaces for inputting data.

BACKGROUND

Current methods of data ingestion do not provide a positive user experience. Conventional software solutions provide various methods for data intake/ingestion. When requesting users to input data, current methods typically provide a list of questions and input fields where the user is requested to "fill in" the data. In a non-limiting example, as depicted in FIG. 1, a server displays various input fields associated with a conventional intake form. Users must interact with the input fields to complete the data intake form. Interacting with static input fields creates a negative user experience for two reasons. First, static input fields provide a tedious and time-consuming data intake method. Second, inputting data using static input fields is an error-prone process where users may enter the information into the wrong input field.

SUMMARY

For the aforementioned reasons, there is a desire for an electronic platform that allows for efficient and timely inputting of data. Described herein are methods and systems to provide an electronic platform that displays dynamic input fields, which emulate a real-life electronic conversation with the user, such as through text messaging. The methods and systems described herein provide chat-like messages to the user allowing the user to interact with the messages and input data where appropriate. The methods and systems described herein reduce data entry time by emulating a conversation with a data intake form.

In an embodiment, a method comprises retrieving, by a server, a set of prompts associated with an electronic form; displaying, by the server for presentation on a webpage, a first graphical element comprising a first conversation bubble shape and containing a text string corresponding to a first prompt of the set of prompts; displaying, by the server, a second graphical element below the first graphical element and comprising a second conversation bubble shape that contains an input element configured to receive an input from a user interacting with the webpage and a button for causing transmission of the input to the server, upon the button being activated to transmit the input in the input element to the server, dynamically revising, by a server, the second graphical element by displaying the input received from the user in the place of the corresponding input element; displaying, by the server, a third graphical element comprising a third conversation bubble shape and containing a second text string corresponding to a second prompt of the set of prompts, wherein the third graphical element is displayed below the second graphical element; and aggregating, by the server, each input from each input element for compiling the electronic form.

In another embodiment, a system comprises a server comprising a processor and a non-transitory computer-readable medium containing instructions that when executed by the processor causes the processor to perform operations comprising: retrieve a set of prompts associated with an electronic form; display, for presentation on a webpage, a first graphical element comprising a first conversation bubble shape and containing a text string corresponding to a first prompt of the set of prompts; display a second graphical element below the first graphical element and comprising a second conversation bubble shape that contains an input element configured to receive an input from a user interacting with the webpage and a button for causing transmission of the input to the server; upon the button being activated to transmit the input in the input element to the server, dynamically revise the second graphical element by displaying the input received from the user in the place of the corresponding input element; display a third graphical element comprising a third conversation bubble shape and containing a second text string corresponding to a second prompt of the set of prompts, wherein the third graphical element is displayed below the second graphical element; and aggregate each input from each input element for compiling the electronic form.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and together with the specification, explain the invention.

DETAILED DESCRIPTION

Figure 1:
FIG. 1 illustrates an example of a conventional data intake form, in accordance with an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Figure 2A:
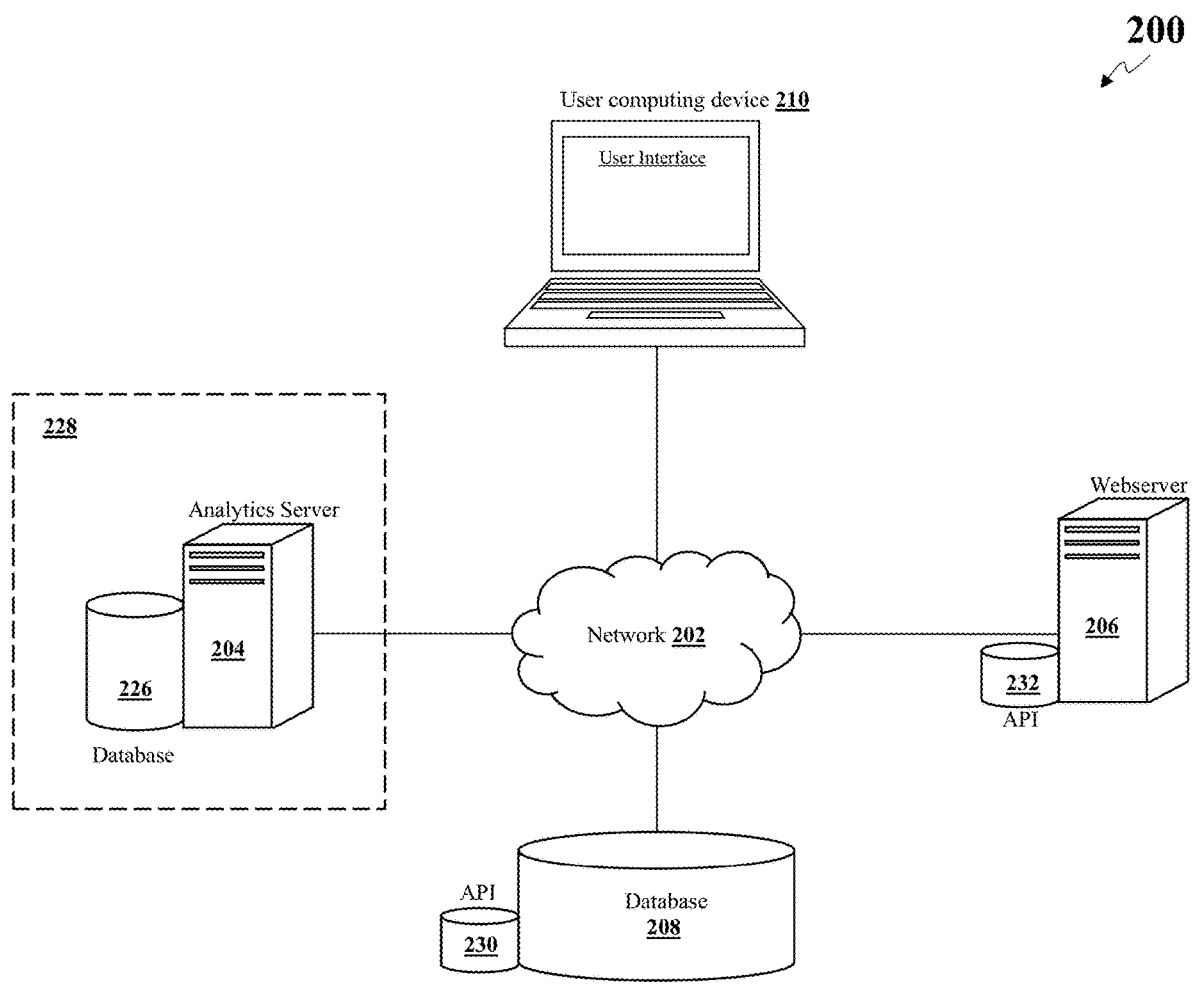
FIG. 2A illustrates an example of a computer system for generating a chat-like data input methods, systems, and graphical user interfaces, in accordance with an embodiment.

FIG. 2A illustrates various components of a system 200 for generating a chat-like data input platform, in accordance with an embodiment. The system 200 provides a non-limiting example of a computer system having various features that can be utilized to provide graphical user interfaces displaying an intelligent data intake form. The system 200 may be utilized by third party webserver (e.g., webserver 206) to incorporate graphical user interfaces generated by the analytics server 204. In some configurations, the graphical user interfaces generated by the analytics server 204 may be incorporated into one or more webpages hosted by the webserver 206. In other configurations, the graphical user interfaces generated by the analytics server 204 may be directly displayed onto the end users computing device (e.g., user-computing device 210).

The system 200 may include an analytics server 204, webserver 206, database 208, and user-computing device 210. These features may communicate with each other over a network 202. The network 202 may include, but is not limited to, private or public local area network, wireless local area network, metropolitan area network, wide-area network, and the Internet. The network 202 may further include both wired and wireless communications according to one or more standards via one or more transport mediums. The communication over the network 202 is in accordance with various communication protocols such as transmission control protocol and internet protocol, user datagram protocol, and institute of electrical and electronics engineers communication protocols. The network 202 may further include wireless communications according to Bluetooth specification sets, or another standard or proprietary wireless communication protocol. The network 202 may further include communications over a cellular network, including, for example, a global system for mobile communications, code division multiple access, and enhanced data for global evolution network.

The system 200 may operate in a local computing environment where the user-computing device 210 may execute an application to access an electronic platform generated/hosted by the webserver 206. An example of an electronic platform may be a website accessible through a browser application. For instance, the user-computing device 210 may execute a browser application and access a website hosted by the webserver 206. Even though some embodiments described herein focus on a website hosted by the webserver, the methods and systems described herein are not limited to websites. For instance, the webserver may also host/generate an internal application accessible by the user-computing device 210 (e.g., internal application native to an organization where an employee operating the user-computing device 210 may access). The methods and systems described herein apply to generating various intelligent data intake graphical user interfaces. These graphical user interfaces may be embedded into other graphical user interfaces and/or applications, such as embedded within a website or any other application.

The system 200 may operate in a cloud-computing environment where the user-computing device 210 may be cloud-optimized. The user computing device 210 data may execute the browser application and access graphical user interfaces generated by the analytics server 204. The graphical user interfaces generated by the analytics server 204 (e.g., services provided by the analytics server 204) may be stored and executed on a remote cloud-based analytics server 204 accessed over a network cloud. In the cloud-computing environment, a web browser on the user-computing device 210 may interface with an application program associated with the analytics server 204, which is executed remotely via cloud-based technology.

The analytics server 204 may be any computing device capable of performing the actions described herein. For instance, the analytics server 204 may include a processing unit, and a non-transitory machine-readable storage medium. The processing unit may include a processor with a computer-readable medium, such as a random access memory coupled to the processor. The analytics server 204 may be executing algorithms or computer executable program instructions, which may be executed by a single processor or multiple processors in a distributed configuration. The analytics server 204 may be configured to interact with one or more software modules of a same or a different type operating within the system 200.

Non-limiting examples of the processor may include a microprocessor, an application specific integrated circuit, and a field programmable object array, among others. The analytics server 204 is capable of executing data processing tasks, data analysis tasks, and valuation tasks. Non-limiting examples of the analytics server 204 may include a desktop computer, a server computer, a laptop computer, a tablet computer, and the like. For ease of explanation, the FIG. 2A depicts a single server computing device functioning as the analytics server 204. However, some embodiments may include a plurality of server computing devices capable of performing various tasks described herein.

The analytics server 204 may utilize a database, such as the database 226, to store and/or retrieve various data described herein. For instance, the analytics server 204 may store different sets of prompts corresponding to different electronic forms/applications within the database 226. Each set of prompts may include an identifier associated with its corresponding electronic form. For instance, the analytics server 204 may populate a dataset corresponding to a set of prompts along with an order of display for each prompt. The dataset may also identify a corresponding electronic form (e.g., online application for credit card X). When the analytics server 228 receives a request from the user-computing device 210 and/or the webserver 206 to display prompts associated with the online application for credit card X, the analytics server 204 queries the database 226 and retrieves the corresponding dataset. The analytics server may then use the methods/systems described herein to dynamically display the set of prompts in accordance with the order of display retrieved from the dataset.

Figure 4:
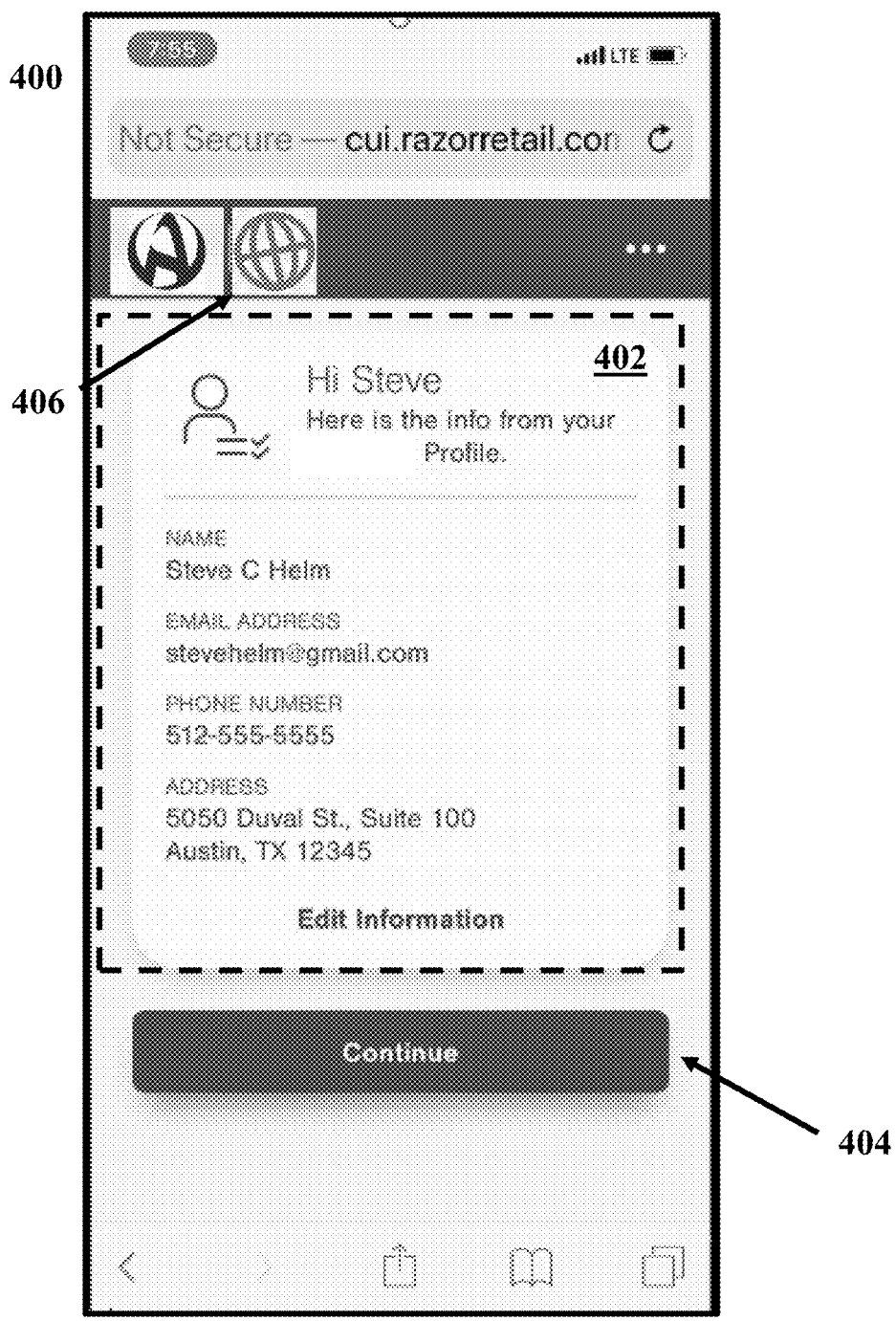
Figure 5:
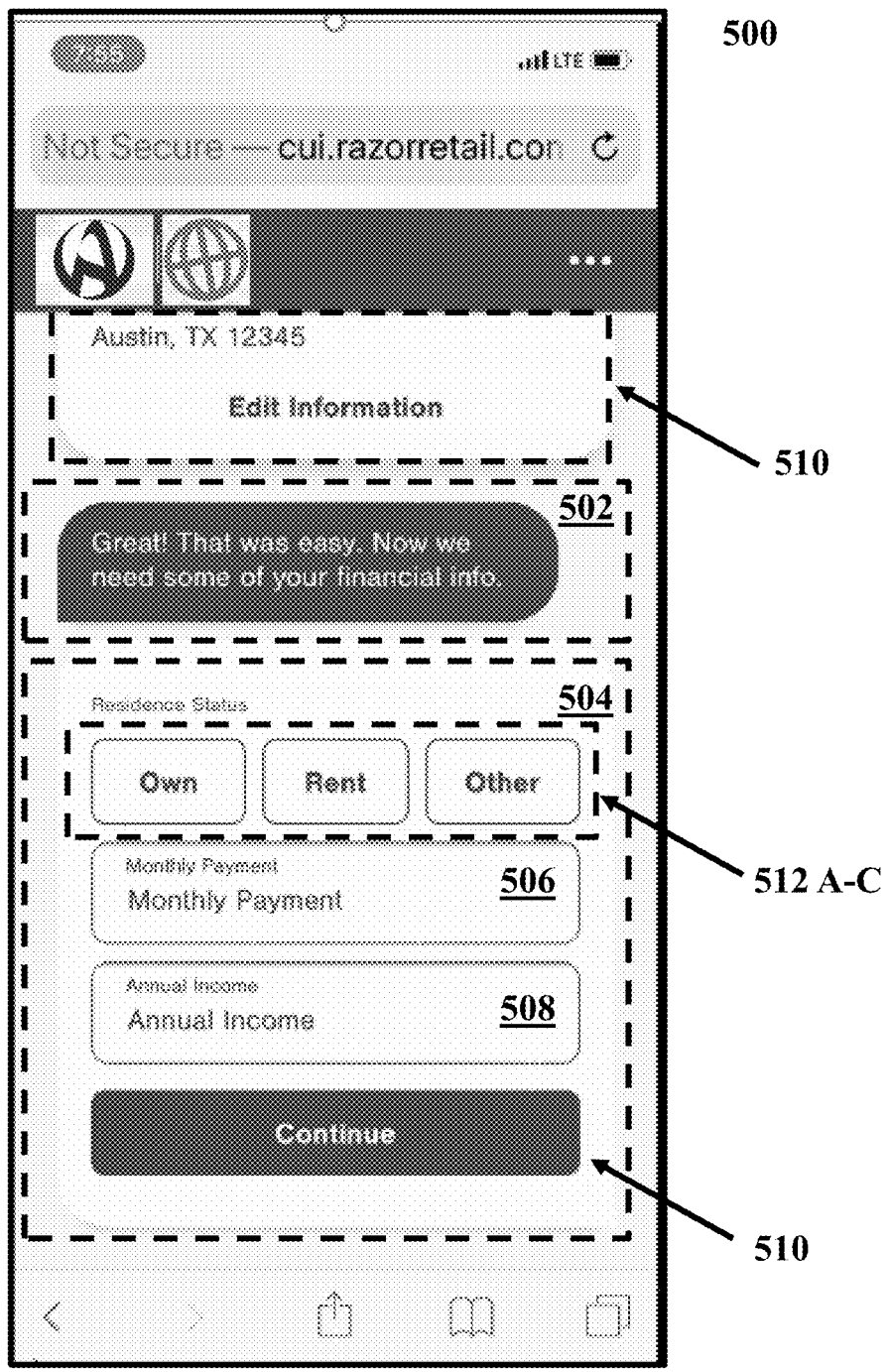
Figure 6:
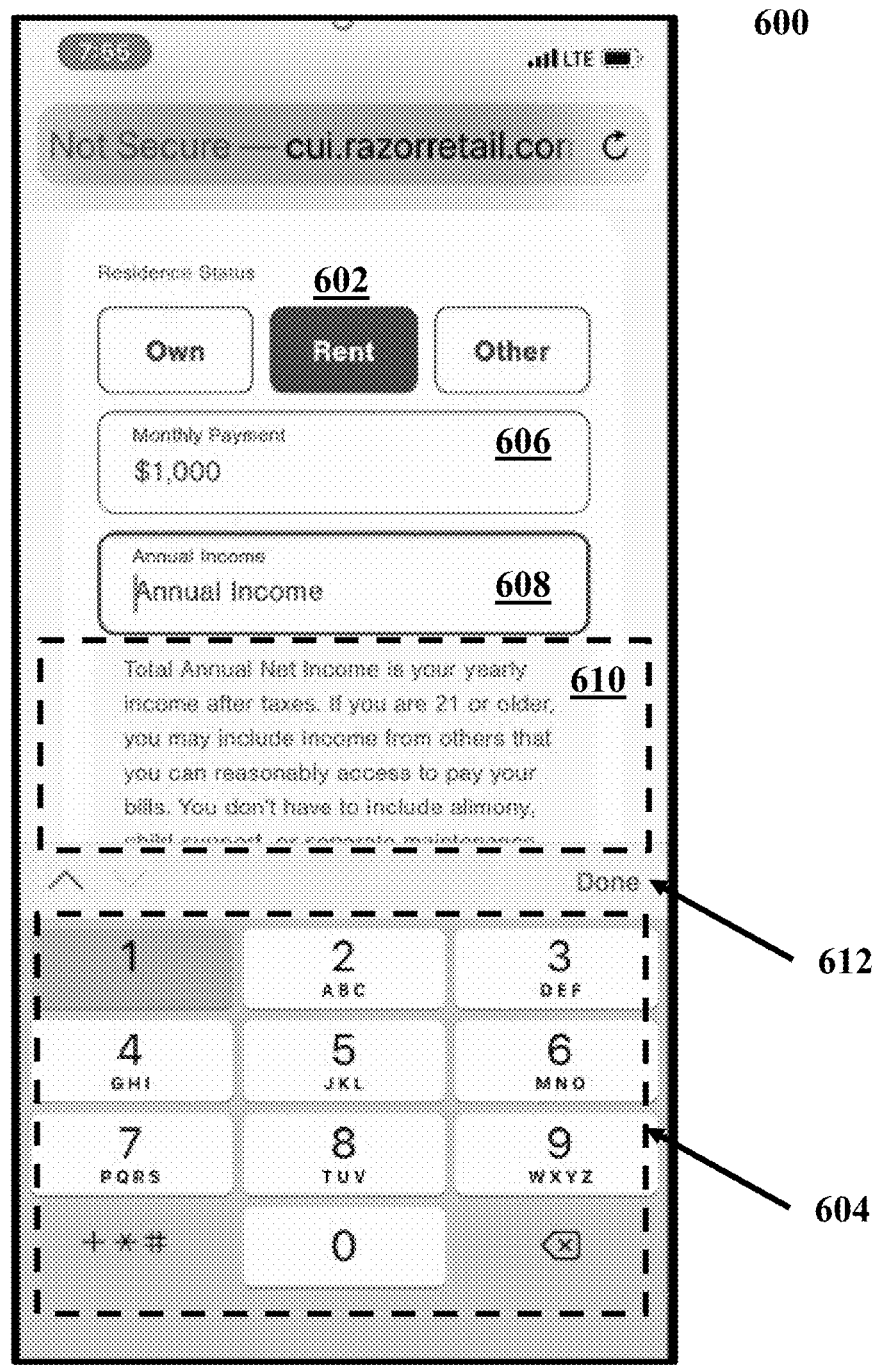

The database 226 may also include data associated with the user operating the user-computing device 210. The analytics server 204 may also retrieve data (e.g., demographic and/or financial) data associated with the user requesting the electronic form. For instance, the database 226 may include user data (e.g., previously populated by the analytics server 204 and/or periodically retrieved from a third-party data source). When the user requests an electronic form, the analytics server 204 may query and retrieve user data from the database 226 and/or database 208. The analytics server may prefill parts of the electronic form, thereby minimizing the inputs required by the user. A non-limiting example of the analytics server 204 prefilling user data is depicted in FIG. 4.

The analytics server 204 and the database 226 may represent a secondary organization's server and database. The secondary organization 228 may be an organization offering dynamic display of electronic forms for the webserver 206. An example of the secondary organization 228 may include a financial institution, such as a bank. In a non-limiting example, the webserver 206 may generate/host a website for a merchant offering credit card services issued/facilitated by a bank (represented here as the secondary organization 228 that includes the analytics server 204). The analytics server 204 may then display the credit card form using methods/systems described herein and may process the user's credit card application.

The analytics server 204 may use various application programming interfaces (APIs) to communicate with different features described herein. An API, as used herein, refers to a computing interface that uses connector programming code to act as a software intermediary between at least two computing components/features described herein. The API may automatically and/or periodically transfer various calls, instructions, and/or requests among different features of the system 200. Using different APIs, the analytics server 204 may automatically transmit and/or receive calls and instruction. For instance, the analytics server 204 may use API 232 to communicate with the webserver 206, such that when a user operating the user computing device 210 requests a particular electronic form, the API 232 automatically transmits an instruction to the analytics server 204. The instruction may include data needed for the analytics server 204 to generate and display the chat-like GUIs described herein. The analytics server 204 may also use the API 230 to communicate with the database 208 (e.g., retrieve the set of prompts).

The API 230 and/or 232 may be two-way APIs. A two way API refers to an API that allows information to be transmitted back and forth between at least two features of the system 200. For instance, when a user operating the user computing device 210 requests an electronic form via a website hosted by the webserver 206, the API 232 may generate a call instructing the analytics server 204 to display the chat-like GUIs described herein. The call may include data associated with the electronic form and/or the user requesting the electronic form. The analytics server 204 may then use the methods and systems described herein to generate various GUIs configured to emulate a conversation with the user.

The analytics server 204 may also use the API 232 to transmit a second call to the webserver 206. The second call may include instructions to display the generated GUIs (e.g., software code defining the GUIs and instructing the webserver 206 to embed the GUIs within one or more webpages). As the webserver 206 displays the GUIs, the analytics server 204 may use the API 232 to receive user inputs (e.g., responses received from the user operating the user-computing device 210). The analytics server 204 may then aggregate the responses and use the API 232 to transmit the aggregated responses to the webserver 206. The analytics server may similarly use a two-way API to communicate with the database 208.

Additionally or alternatively, the analytics server may use a content delivery network (CDN) to ensure data integrity when communicating with different features described in the system 200. A CDN, as described herein, refers to a distributed delivery network of proxy servers/nodes that uses multi-layered delivery methods/systems to transmit data (e.g., Akamai). The analytics server 204 may use a CDN when communicating various calls/instructions with the webserver 206 (directly or via the API 232) and/or the database 208 (directly or via the API 230).

The webserver 206 may be a computing device hosting a website (or any other electronic platform) accessible to the user-computing device 210 via the network 202. The webserver 206 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application specific integrated circuit, and a field programmable object array, among others. Non-limiting examples of the webserver 206 may include workstation computers, laptop computers, server computers, laptop computers, and the like. While the system 200 includes a single webserver 206, in some embodiments the webserver 206 may include a number of computing devices operating in a distributed computing environment.

The webserver 206 may be executing algorithms or computer executable program instructions, which may be executed by a single processor or multiple processors in a distributed configuration. The webserver 206 may be configured to interact with one or more software modules of a same or a different type operating within the system 200. For instance, the webserver 206 may execute software applications configured to host an electronic platform, which may generate and serve various webpages to the user-computing device 210. The electronic platform may also embed various graphical user interfaces generated by the analytics server 204.

The webserver 206 may execute software applications configured to display the user interfaces described herein (e.g., host a website that displays graphical user interfaces generated by the analytics server 204), which may generate and serve various webpages to user computing device 210. The analytics server 204 and/or the webserver 206 may be configured to require user authentication based upon a set of user authorization credentials (e.g., username, password, biometrics, cryptographic certificate, and the like). In such implementations, the analytics server 204 and/or the webserver 206 may access a system database (e.g., database 208) configured to store user credentials, which the analytics server 204 and/or the webserver 206 may be configured to reference in order to determine whether a set of entered credentials (purportedly authenticating the user) match an appropriate set of credentials that identify and authenticate the user.

The analytics server 204 and/or the webserver 206 may generate and host webpages onto the user-computing device 210 based upon a user's role within the system 200. In such implementations, the user's role may be defined by data fields and input fields in user records stored in the database 208. The analytics server 204 and/or the webserver 206 may authentication the user and may identify the user's role by executing an access directory protocol (e.g. LDAP).

The webserver 206 may generate and serve webpages associated with the valuation software application to the user-computing device 210 based upon information associated with the user and structure of the interactive graphical user interface of the user-computing device 210. The information associated with the user may be defined by data fields in user records stored in the local memory. The webserver 206 may conduct an authentication of the user by executing an access directory protocol. Upon authentication, the webserver 206 may generate the webpages as described herein.

The user-computing device 210 is a computing device including a processing unit. The processing unit may execute a valuation software application or a web browser application that accesses or receives data records from the database 208. The processing unit may include a processor with computer-readable medium, such as a random access memory coupled to the processor. The user-computing device 210 may be running algorithms or computer executable program instructions, which may be executed by a single processor or multiple processors in a distributed configuration. The user-computing device 210 may interact with one or more software modules of a same or a different type operating within the system 200.

Non-limiting examples of the processor may include a microprocessor, an application specific integrated circuit, and a field programmable object array, among others. Non-limiting examples of the user-computing device 210 may include a server computer, a workstation computer, a tablet device, and a mobile device (e.g., smartphone, PDA). An end user (inputting the data or filling out the electronic form)

may operate the user-computing device 210. The user may be a client of the financial company. For ease of explanation, FIG. 2A illustrates a single computing device functioning as the user computing device 210. However, some embodiments may include a plurality of computing devices capable of performing the tasks described herein.

The database 208 associated with the analytics server 204, the webserver 206, the data sources 102, and the user-computing device 210 is capable of storing information in various formats and/or encrypted versions. The information may include data records associated with various companies utilizing the webserver 206, data records associated with the webserver 206, user preferences, a set of prompts (e.g., question, query, inquiry), attributes associated with various graphical user interfaces to be generated by the analytics server 204, and the like. The database 208 may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions. Even though the database 208 is shown as a separate computing feature, the database 208 may be a part of a computing environment that includes the webserver 206. For instance, the database 208 and the webserver 206 may belong to a merchant computing environment where the webserver 206 retrieves merchant data from the database 208 to host a website.

Utilizing the web browser executing on the user-computing device 210, a user may generate a request that can be transmitted to the analytics server 204 and/or the webserver 206. Specifically, the user may request to fill out an electronic form and submit the form using a website generated by the web server 206. As a result, the web server 206 may instruct the analytics server 204 to generate a chat-like intelligent data input form to collect the user's information. The request may also include data associated with the user (e.g., demographic data and/or user preferences) and data associated with the user's request (e.g., attributes of the form to be filled out by the user, number and sequence of prompts to be displayed, and various disclaimers associated with the user's request).

The analytics server 204 may then generate various graphical user interfaces that represent a chat-like intelligent data input form designed to interact with the user operating the user-computing device 210. The analytics server 204 may then generate various interactive graphical user interfaces and may instruct the webserver 206 to incorporate the generated graphical user interfaces within the website displayed on the user-computing device 210. The analytics server 204 and/or webserver 206 may display the graphical user interfaces generated by the analytics server 204 in a manner that is indistinguishable from the website hosted by the webserver 206. For instance, the graphical user interfaces generated by the analytics server 204 may be implemented/embedded within the website generated/hosted by the webserver 206, such that they share the same look and feel. In this way, the user is not directed to a new webpage and seamlessly interacts with the chat-like data input forms.

The analytics server 204 and/or webserver 206 may monitor the user's interactions with the graphical user interfaces generated by the analytics server 204. For instance, the analytics server 204 and/or the webserver 206 may record data inputted by the user and may transmit the recorded data (e.g., submitted application) to another server for processing.

Figure 2B:
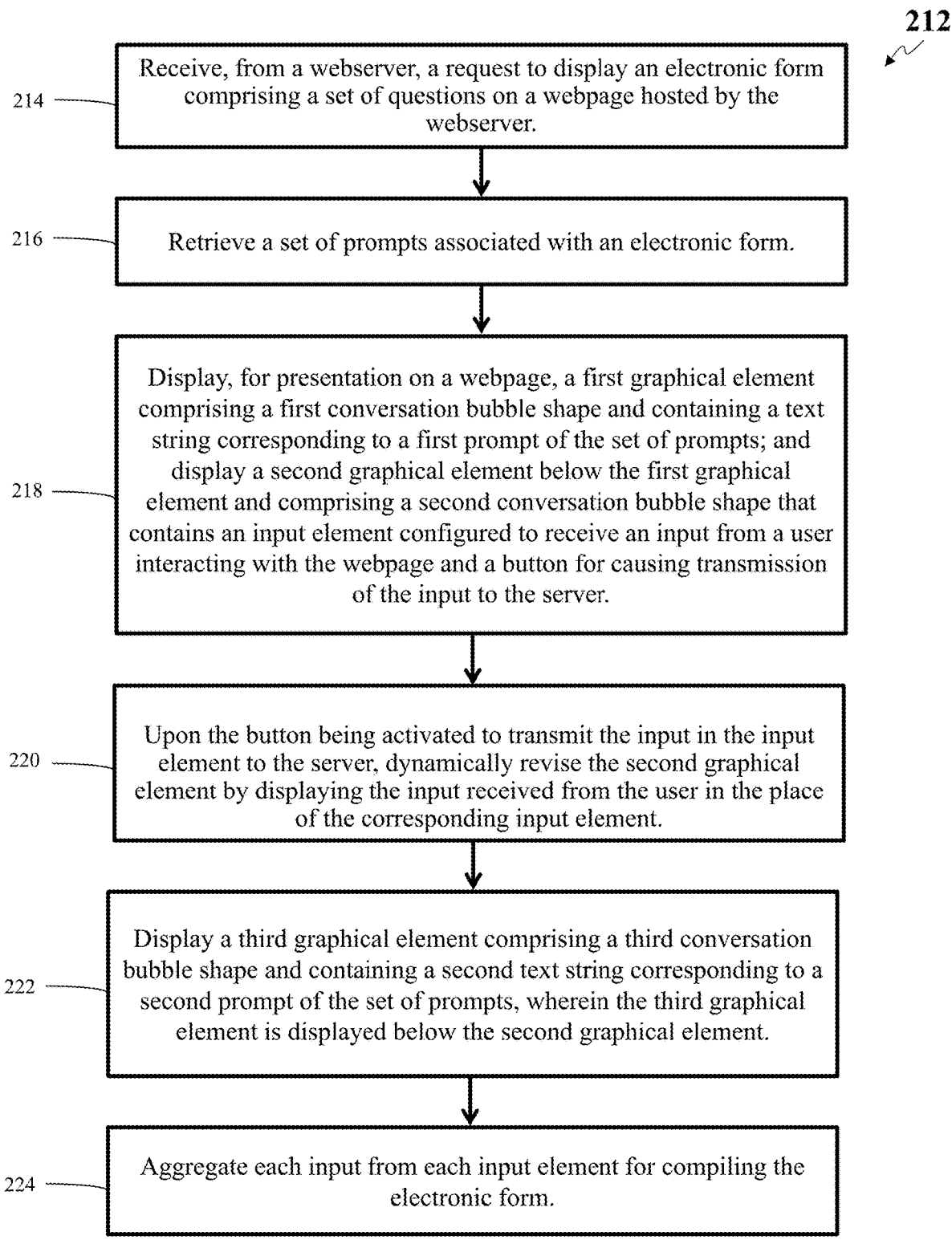
FIG. 2B illustrates a flowchart depicting operational steps for a chat-like data input method/system, in accordance with an embodiment.

FIG. 2B illustrates a flowchart depicting operational steps for a chat-like data input method/system, in accordance with an embodiment. The method 212 describes how a server, such as the analytics server described in FIG. 2A, displays various interactive graphical user interfaces configured to receive users' inputs. Even though the method 212 is described as being executed by the analytics server, the method 212 can be executed by any server and/or locally within a user's computing device or as a browser extension. Additionally or alternatively, the method 212 can be executed by a webserver acting as both a webserver and the analytics server by hosting the website and generating the graphical user interfaces described herein. Furthermore, other configurations of the method 212 may comprise additional or alternative steps, or may omit one or more steps altogether.

At step 214, the analytics server may receive, from a webserver, a request to display an electronic form comprising a set of prompts on a first webpage hosted by the webserver. The analytics server may receive a request from a webserver to generate one or more dynamic chat-like graphical user interfaces configured to receive a user's data. The request may be generated and transmitted by the webserver hosting a website accessed by a user on his computing device. For instance, a user may initiate a web browser application and access a website generated/hosted by webserver. Non-limiting examples of websites may include merchant websites providing goods and services to users on the World Wide Web.

In a non-limiting example, a user may interact with a graphical element displayed within the website hosted by the webserver and indicated a desire to submit an application or access an electronic form. In order to submit his application, the user may be required to provide various data (e.g., demographic data). As described above, conventional software solutions provide static prompts and answers where the user can read the question and provide his answer by inputting data within the input fields. As described in the method 212, the webserver may request the analytics server to generate dynamic and chat-like graphical user interfaces in order to enhance and improve the user's experience.

The request received by the analytics server may include preliminary data associated with the user. For instance, before requesting to submit his application, the user may provide his demographic information. For instance, the user may login the website provided by the web server. As a result, the web server may access the user's demographic data previously inputted by the user and/or retrieved from a third party. When transmitting the request to the analytics server, the webserver may include the user's demographic data and any other data included in the user's profile, such as user preferences or other data enriched by third-party data sources.

The webserver may also include data associated with the user's device, such as IP address, location data, MAC address, and the like. The request may also include attributes associated with the electronic form requested by the user (e.g., electronic form identifier). For instance, the webserver may indicate which form has been requested by the user (e.g., credit card form). As will be described below, the analytics server may use this data to retrieve relevant prompts, their respective sequence of display and various other data associated with the electronic form (e.g., disclaimers).

At step 216, the analytics server may retrieve a set of prompts associated with an electronic form. The analytics server may also retrieve a corresponding sequence/order for displaying the retrieved prompts. Upon receiving the request from the webserver, the analytics server may query and retrieve data to be displayed within the dynamic and chat-like graphical user interfaces from a data repository (e.g., database described in FIG. 2A). The analytics server may use the data included within the request (received from the webserver in step 214) to retrieve a set of prompts (e.g., questions) relevant to the user's request (e.g., associated with the requested electronic form). The analytics server may also retrieve an order (if any) associated with the prompts. For instance, the webserver or a system administrator may identify an order in which the prompts must be presented.

In a non-limiting example, a user may access a website hosted by the webserver and request to submit an application for a credit card. The webserver may generate and transmit a request to the analytics server that includes the user's demographic data (e.g., login or account name) and/or information associated with the credit card application (e.g., name of the credit card requested by the user). As a result, the analytics server may query a database (internal and/or external to the webserver) using the information included in the request received from the webserver. The analytics server may then retrieve a set of prompts associated with the credit card application, a sequential order associated with the prompts (e.g., a predetermined order of how the webserver desires to display the prompts), and any data associated with the user (e.g., users preferences and demographic data, such as home address, contact information, and the like).

The analytics server may also retrieve various information designated by the webserver that are associated with the request. For instance, the webserver may have predetermined rules associated with each application. For example, for a particular credit card application, the webserver may have previously requested the analytics server to display one or more disclaimers and ensure that the user has reviewed and accepted the disclaimers before submitting the application. As will be depicted and described below, the analytics server may retrieve the disclaimers and display them according to the predetermined rules set by the webserver or a system administrator.

At step 218, the analytics server may display, for presentation on a webpage, a first graphical element comprising a first conversation bubble shape and containing a text string corresponding to a first prompt of the set of prompts. The analytics server may also display a second graphical element below the first graphical element and comprising a second conversation bubble shape that contains an input element configured to receive an input from a user interacting with the webpage and a button for causing transmission of the input to the server.

The analytics server may display the graphical elements in conversation bubble shapes. A conversation bubble (e.g., dialogue balloon) may be any predetermined graphical element configured to emulate an electronic conversation with the user. The analytics server may display the conversation bubbles in accordance with predetermined and revisable visual attributes. The analytics server may retrieve the visual attributes corresponding to the conversation bubbles (e.g., font, text size, shape, and/or color) along with the set of prompts (step 214). For instance, the webserver (or a system administrator) may identify default visual attributes for the conversation bubbles and the analytics server may display various prompts and input elements within conversation bubbles having those attributes, as depicted in FIGS. 3-10.

The conversation bubble shape may be adjusted in size based on the amount of content or sizes of input elements and/or buttons within the first graphical element. The conversation bubble shape is intended to resemble the look-and-feel of a conversation between two or more users, such as using text messaging. So the conversation bubble shape can have a rectangular shape, with or without rounded corners, and one corner can converge at a point on a left side or a right side of the display. The point may be on the left side for a first speaker, and the point may be on the right side for a second speaker. In the example embodiment shown, the point is on the left side for the graphical elements containing prompts from the server, and the point is on the right side for the graphical elements having an input from the user. The conversation bubble shape and alternating pointed ends have the look-and-feel of a conversation while inputting information to complete an electronic form.

The analytics server may display two graphical elements where the first graphical element corresponds to a first prompt retrieved from the database (e.g., the first prompt of the electronic form requested by the user). The analytics server may display a second graphical element that comprises various input fields associated with a response to the first prompt.

The analytics server may display two graphical elements corresponding to the first prompt from the set of prompts retrieved. The first graphical element may directly correspond to a first prompt within the set of prompts retrieved. The second graphical element may correspond to input fields configured to receive the user's response to the prompt presented within the first graphical element. An example of the first graphical element may include the graphical element 502 depicted FIG. 5. An example of the second graphical element may include the graphical element 504 displayed in FIG. 5.

The analytics server may display the first graphical element in a visually distinct manner when compared to the second graphical element. The analytics server may emulate an electronic conversation (e.g., text message conversation or chatting with another user on an electronic platform) by displaying the graphical elements in a visually distinct manner from each other. For instance, the graphical element 502 may be a different color than the graphical element 504. Specifically, the analytics server displays the graphical elements using different colors to create the illusion that the user is having a conversation with the analytics server. As will be described below, the analytics server may augment this illusion by relocating various graphical elements in a manner that is consistent with an electronic chat session. In some configurations, the analytics server may display all the graphical elements presenting prompts in a manner that is visually distinguishable from all the graphical elements that include input fields.

Visual attributes associated with the first and/or second graphical elements may be consistent with the data retrieved from the database. For instance, the webserver may previously identify visual elements associated with the graphical user interfaces generated by the analytics server. Non-limiting examples of visual elements may include font type, font size, spacing, type of input element (e.g., radio button, text string input, and/or drop-down menu), and the like. Additionally or alternatively, a system administrator and/or the user may revise these visual elements. For instance, a user may select bigger fonts or a type of input field (e.g., some users rather input their responses using interactive buttons and some users rather type their responses).

The second graphical element may also include an interactive button for causing transmission of the input to the analytics server. The analytics server may display an interactive link within the second graphical element allowing the user to confirm inputting his response. The analytics server may display the interactive link as an interactive button (e.g., the interactive button 510, depicted in FIG. 5) or any other interactive element. The user may interact with the interactive link to indicate that user has inputted his response to the displayed prompt (first graphical element).

Additionally or alternatively, the analytics server may instruct the webserver to display a subset of the set of prompts, wherein the server causes the webserver to display the set of prompts in accordance with the graphical user interfaces generated by the analytics server. The analytics server may generate various graphical user interfaces as described below and depicted in FIGS. 3-10. The analytics server may also instruct the webserver to embed the graphical user interfaces within the website generated/hosted by the webserver. In a non-limiting example, the analytics server may access software scripts (e.g., HTML code) associated with the website and may reconfigure the scripts, such that the newly generated graphical user interfaces are embedded within the website.

Referring back to FIG. 2B, at step 220, upon the button being activated to transmit the input in the input element to the server, the analytics server may dynamically revise the second graphical element by displaying the input received from the user in the place of the corresponding input element. As described above, the analytics server may display the second graphical element that includes various input elements and an interactive button. The user may utilize the input elements to input a response to the prompt displayed within the first graphical element (e.g., chat bubble displaying the prompt). When the user desires to submit his responses, the user may interact/activate the interactive button. When the analytics server receives an indication that the interactive button has been activated, the analytics server determines that the user has submitted his response and revises the second graphical element as described herein.

Upon displaying the first and/or the second graphical elements, the analytics server may monitor the user's interactions with the input fields within the second graphical element. When the user interacts with one or more input elements of the second graphical element (e.g., when a user inputs and/or submits a response), the analytics server may revise the second graphical element by removing the input elements and displaying the user's responses within the revised second graphical element.

The analytics server may dynamically revise the second graphical element when the user submits his response (input). For instance, as depicted in the graphical element 702 in FIG. 7, the analytics server may remove the input fields and interactive buttons associated with the graphical elements 702 (e.g., interactive buttons 512A-C and input fields 506 and 508, and the interactive button 510, depicted in FIG. 5). The revised graphical element may include the result and responses inputted by the user. The revised graphical element may also include an interactive button allowing user to revert to an "un-revised" version of the graphical element (e.g., the graphical element displaying various input fields and interactive buttons) to edit his response. In some configurations, the analytics server may also relocate the second graphical element. For instance, similar to relocation of the first graphical element, the analytics server may move the revised second graphical element (e.g., move up the revised second graphical element proportional to the relocated first graphical element).

Additionally or alternatively, the analytics server may revise the second graphical element by changing a visual attribute of the second graphical element. For instance, the revised second graphical element may be displayed in a different color or a different shade of the same color. This may indicate that the user has already inputted his response.

Figure 7:
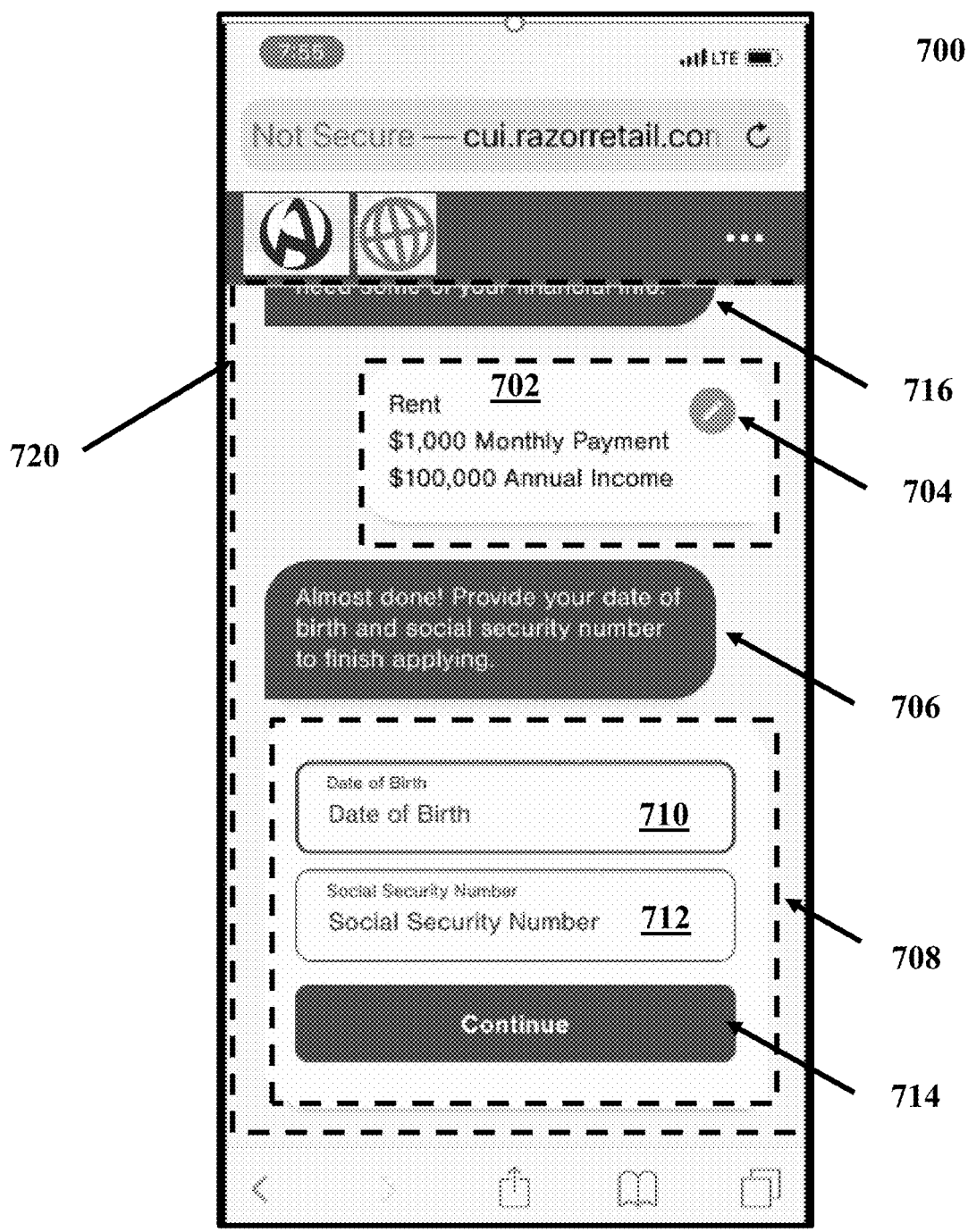

Additionally or alternatively, the analytics server may shift the graphical elements in a manner consistent with electronic communications (e.g., electronic chat sessions). For instance, as depicted in FIG. 7, the analytics server may relocate the first graphical indicator (graphical element 502 in FIG. 5) and display the graphical element 716. A non-limiting example of relocating a graphical element may be relocating the graphical element in an upward manner. This relocation may occur by adding a graphical element to the bottom of page and moving the display to show the most recent graphical elements, thereby appearing that the earlier graphical elements moved upwards. For instance, FIG. 7 depicts a chat screen 720 where older graphical elements that emulate conversation with the user may be shifted upward within the chat screen 720 as new prompts are displayed (e.g., graphical element 708). The analytics server may incrementally move all the graphical elements when new graphical elements are displayed. For instance, the analytics server may change the relative position of the graphical elements 716, such that the graphical element 716 exits the chat screen as newer graphical elements (e.g., graphical elements 708) are displayed.

Referring back to FIG. 2B, at step 222, the analytics server may display a third graphical element comprising a third conversation bubble shape and containing a second text string corresponding to a second prompt of the set of prompts, wherein the third graphical element is displayed below the second graphical element. The analytics server may display a third graphical element (having a third conversation bubble) corresponding to the next prompt within the set of prompts retrieved. In accordance with the predetermined order of prompt/questions, the analytics server may identify a next logical prompt and may display a third graphical element that displays a text string corresponding to the next prompt. Using the methods and systems described herein, the analytics server may continue the process described above and continuously display a sequence of prompts until every (or at least a part of) the retrieved set of prompts is displayed. When all or some of the set of prompts retrieved is displayed and responded to by the user, the analytics server may transmit the user's responses to the webserver.

Additionally or alternatively, when every prompt has been responded to, the analytics server may query and retrieve predetermined language associated with the electronic form and may display the predetermined text accordingly. For instance, the webserver may define various text strings associated with particular electronic forms (e.g., a disclaimer must be displayed along with a particular credit card application where the user must confirm that the user has read and understood the terms and condition).

At step 224, the analytics server may aggregate each input from each input element for compiling the electronic form. Using the methods and system described herein, the analytics server may iteratively display all prompts within the set of retrieved prompts (step 216). For instance, the analytics server may continue displaying chat-like graphical elements (conversation bubbles) corresponding to a "next" prompt within the set of prompts. When the analytics server receives the users input to all (or a predetermined portion) of the set of prompts, the analytics server may aggregate the user's responses to each input and may transmit the aggregated responses to a server, such as the webserver or any other server associated with the electronic form and/or the website. For instance, the analytics server may generate a file that includes all the user's responses and may transmit the file the webserver where the webserver can compile the electronic form/user's inputs by executing various analytical protocols using the user's responses (e.g., approve/deny the user's credit card application).

Referring now to FIGS. 3-10, non-limiting examples of the graphical user interfaces described herein is illustrated. Even though FIGS. 3-10 illustrate a progression in sequential graphical user interfaces, in some configurations the analytics server may display the depicted graphical user interfaces in another order. Moreover, the analytics server may not display one or more of the graphical user interfaces described herein. The analytics server may display various combinations and configurations of the graphical user interfaces depicted herein.

The graphical user interfaces depicted in FIGS. 3-10 illustrate one or more graphical user interfaces displayed by the analytics server through a webserver, as described in FIG. 1. For instance, a user may log into third party website and request various services where a webserver associated with the website (e.g., hosting the website) may communicate the information to the analytics server. The analytics server may in turn display the graphical user interfaces depicted herein using "look and feel" of the third-party website. Therefore, the user may not be required to leave the third-party website and/or initiate a new graphical user interface generated by the analytics server. In some configurations, however, the user may be directed to a new website where the analytics server displays the graphical user interfaces described herein.

Furthermore, the chat-like dynamic graphical user interfaces described herein are depicted as having a chat window that consumes the entire display screen of the electronic device operated by the user. In some configurations, the chat screen may be smaller or may be displayed within a predetermined portion of the display screen.

Figure 3:
FIG. 3-10 illustrate various graphical user interfaces displayed by the analytics server, in accordance with different embodiments.

As depicted in FIG. 3, an end-user may initiate a web browser on his mobile application and direct the web browser to a website configured to receive his financial information and submit an application for a credit card. When the user submits his request to apply for a credit card, a webserver associated with the website may generate a call to the analytics server. The call me correspond to sending a notification to the analytics server where the notification indicates that a user has requested to apply for a credit card. The analytics server may then use the methods and systems described herein to display the graphical user interfaces described herein and to display dynamic questionnaires, such that the end user inputs his information in a chat-like fashion.

Upon receiving the notification from the webserver, the analytics server may first retrieve demographic data associated with the user. The analytics server may receive user identification data from the webserver, such as login information and/or device identification data (e.g., IP address, locations information, or MAC address). Upon receiving the identification from the webserver, the analytics server may query and retrieve data associated with the user. The analytics server may also pre-fill various input elements for the user's review, such that the user is not required to provide that information. In some configuration, if the analytics server identifies a response to a prompt, the analytics server may no longer display the dynamic input fields corresponding to that particular prompt.

The GUI 300 illustrates an initial graphical user interface displayed by the analytics server. The analytics server may display demographic or other data retrieved within the graphical element 302. The analytics server may then provide the option for the user to review and confirm the data retrieved. If the user agrees with the data displayed within the graphical element 302, the user may interact with the interactive button 304 to proceed to the next step. If the user does not agree with the data displayed within the graphical element 302, the user may interact with the hyperlink 306 and update his information. If the user interacts with the interactive button 304, the analytics server proceeds to FIG. 4 (the GUI 400). The GUI 300 may also include a logo of the webserver (hosting the webpage), as depicted by the graphical indicator 308.

The GUI 400 includes the graphical element 402, which displays various demographic data associated with the user. As described above, the analytics server provides the user with an option to edit his information. The GUI 400 may also include the graphical indicator 406 indicating that the webpage (GUI 400) is generated by the analytics server but embedded within a webpage hosted by the webserver (associated with the credit card company or the merchant). If the user agrees with the displayed information, the user interacts with the interactive button 404 to proceed to the next step (the GUI 500).

In the GUI 500, the analytics server displays a first graphical element that represents a conversation between an agent of the third-party website and the user. For example, graphical element 502 represents a statement, prompt, or question posed by a representative of the website. As described above, the graphical element 502 may include a chat-like statement, prompt, or question (e.g., string of characters) asking the user one or more questions. The analytics server may also display the graphical element 504, which may include one or more input fields configured to receive the user's response to the prompt posed/displayed in the graphical element 502. When displaying the graphical element 502, the analytics sever may relocate the graphical element 510 (formerly graphical element 402) within the display screen. The analytics server may continuously relocate "older" graphical elements when "newer" graphical elements are displayed. For instance, the analytics server may move a graphical elements out of the chat screen (e.g., move up within the GUI 500) as new graphical elements replace them. Even through in the depicted embodiment illustrates relocating the graphical element 510 in an upward direction, the analytics server may relocate the "older" graphical element to any directions within the display screen.

In the depicted example, the analytics server displays a chat-like statement within the graphical element 502 informing the user that the analytics server will display another graphical element for acquiring more information. After displaying the graphical element 502, the analytics server may display the graphical element 504. In some embodiments, the analytics server may display the graphical elements 502 and 504 simultaneously. In other embodiments, the analytics server may display the graphical element 504 within a predetermined amount of time subsequent to displaying the graphical element 502 (e.g., 2, 5, or 10 seconds). The predetermined amount of time between displaying the graphical element 502 and graphical element 504 may be revised by the end user and/or the webserver associated with third-party website. For instance, if the user desires, the user may edit how slow/fast prompts and/or input elements are displayed.

The analytics server may display the graphical elements 502 and 504 in a chat-like manner. For instance, the analytics server may display the graphical element 502 and inform the user that the user must input his financial information. After a predetermined time, the analytics server may relocate the graphical element 502 (e.g., move the graphical element 502 in a higher location within the display screen or GUI 500). The analytics server may also display the graphical elements 502 and 504 in a visually distinct manner. For instance, as customary in chat and messaging applications, the analytics server may display the graphical element 502 in a different color than the graphical element 504. In some configurations, the analytics server may display all graphical elements displaying a prompt and/or statements in a first color (e.g., blue). The analytics server may display all graphical elements corresponding to input elements and statements inputted by the user in a second color (e.g., gray or white).

The graphical element 504 may include various input elements. For example, input elements may include interactive buttons 512 A-C where a user can select an option. The user may interact with any of the interactive buttons to input his answer. The graphical element 504 may also include text input fields where the user can input a text string (e.g., alphanumerical string). In some embodiments, each input field may include a statement indicating a category of inputs needed. For instance, interactive buttons 512 A-C may include a statement "residence status." Each interactive button 512 A-C may also include a statement representing an answer (e.g., "rent," "own," or "other"). The input fields 506 and 508 may also include statements indicating the required input from the user. For instance, input fields 506 indicates that the user is required to input his monthly payment.

When the user interacts with any of the interactive buttons 512 A-C, the analytics server may display that particular interactive button in a visually distinct matter. For instance if the user interacts with the interactive button 506B, the analytics server may display the interactive button 602, as depicted in GUI 600 and FIG. 6.

When the user interacts with the input fields 506 or 508, the analytics server may display the graphical component 604, which may include an interactive keyboard allowing the user to input his answers. The analytics server may also display the response inputted by the user, as depicted in the interactive button 606 (e.g., the user has reported a monthly income of $1000). In some configurations, when the user interacts with an input field, the analytics server may display a description of the type/category of the response needed. For example, when the user interacts with input field 608, the analytics server may display the graphical element 610 describing what constitutes annual income. Upon inputting his responses while interacting with the graphical component 604, the user may interact with the graphical element 612 to submit his responses. If the user submits his responses, the analytics server may proceed to the next step (GUI 700).

As described above, various graphical attributes of the graphical user interfaces shown herein can be customized and revised by the end user and/or the webserver hosting the third-party website. For instance, the analytics server may design and display colors, fonts, shapes, and other graphical attributes of each interactive button, input element, and/or other graphical elements/components/indicators in accordance with predetermined preferences received from the user and/or the webserver.

In FIG. 7, the analytics server displays the graphical user interface 700 when the analytics identifies an indication that the user has submitted his inputs. When the user interacts with the graphical element 612, the analytics server generates the graphical element 702, which corresponds to inputs received via the user interacting with the graphical element 502. The graphical elements 702 may include the graphical indicator (e.g., an interactive button) 704 which allows the user to re-access input fields associated with the prompt presented (e.g., input fields 606 or 608 and the interactive buttons 602). In this way, the user may edit his answers.

The graphical component 702 also includes a summary of the values inputted by the user, as previously shown and described. For instance, the graphical component 702 indicates that the user has indicated that he is renting his place of residence for $2000 a month and his income is hundred thousand dollars a year.

The analytics server may display the graphical element 702 in a chat-like manner (e.g., move the graphical elements 702 higher within the GUI 700 as the analytics server displays the graphical element 706). After displaying the graphical element 702, the analytics server may retrieve a subsequent prompt and display a corresponding graphical element 706. As depicted, the graphical element 706 describes that a subsequent prompt will inquire about the user's date of birth and Social Security number.

The analytics server may then display the graphical element 708, which includes the input fields 710 and 712. These input fields may be configured to receive data inputted by the user. The graphical element 708 also includes the interactive button 714, which indicates that the user is willing to submit his responses and move forward in the application process. When the user interacts with the interactive button 714, the analytics server moves to GUI 800, depicted in FIG. 8.

Figure 8:
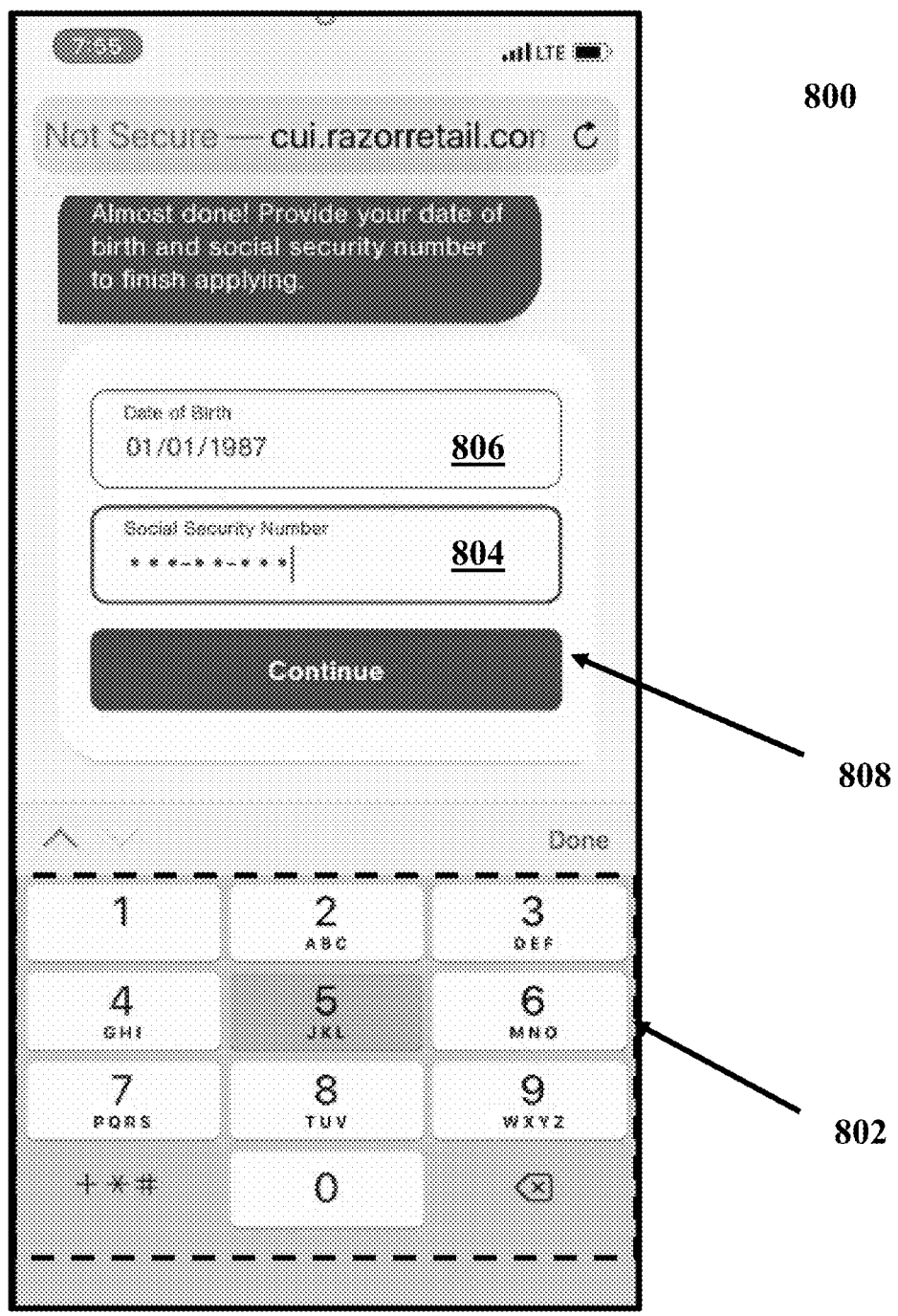

As depicted in FIG. 8, the user may interact with the graphical element 802 to input his responses using the input elements 804 and 806. In some configurations, as depicted in FIG. 8, the analytics server may obfuscate the responses inputted by the user. For instance, the analytics server may obfuscate the responses inputted into the input element 804. Upon the user interacting with the interactive button 808, analytics server moves to the next step (e.g., GUI 900). When the analytics server identifies that the user has interacted with an input element/field, the analytics server may also relocate the graphical element 706 in the manner depicted in FIG. 8.

Figure 9:
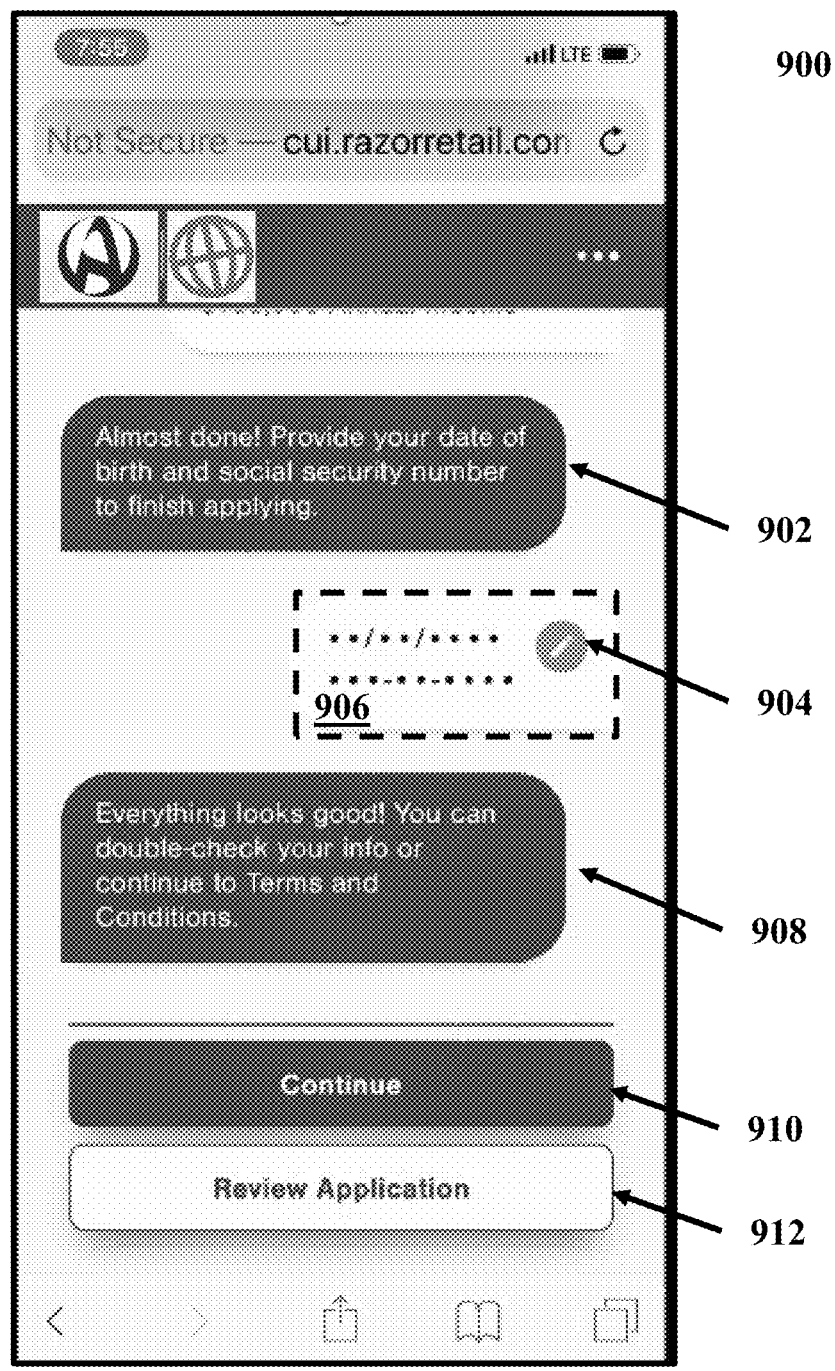

As depicted in FIG. 9, the analytics server may relocate the graphical elements 706 (relocated into graphical element 902). The analytics server may also display the graphical element 906, which represents the values inputted into the input elements 804 and 806. As depicted, the analytics server may obfuscate the answers such that a person viewing the graphical user interface 900 may not identify the user's Social Security number or other personally identifiable information. The analytics server may also display the graphical indicator (interactive button) 904 allowing the user to edit his inputted information. After displaying the graphical element 904 (e.g., instantaneously or after a predetermined amount of time), the analytics server may determine that all necessary prompts have been responded to. The analytics server may query a database having a sequence of prompts and may identify that the user has responded to the last prompt necessary to submit his application. As a result, the analytics server may display the graphical element 908 indicating that the user has finished the application.

The analytics server may also display the interactive button 910 and 912. If the user interacts with the interactive button 910, the analytics server may move to GUI 1000, depicted in FIG. 10. If the user interacts with the interactive button 912, the analytics server may display the user's responses and/or corresponding prompts, such that the user is able to review his responses before submitting the application.

Figure 10:
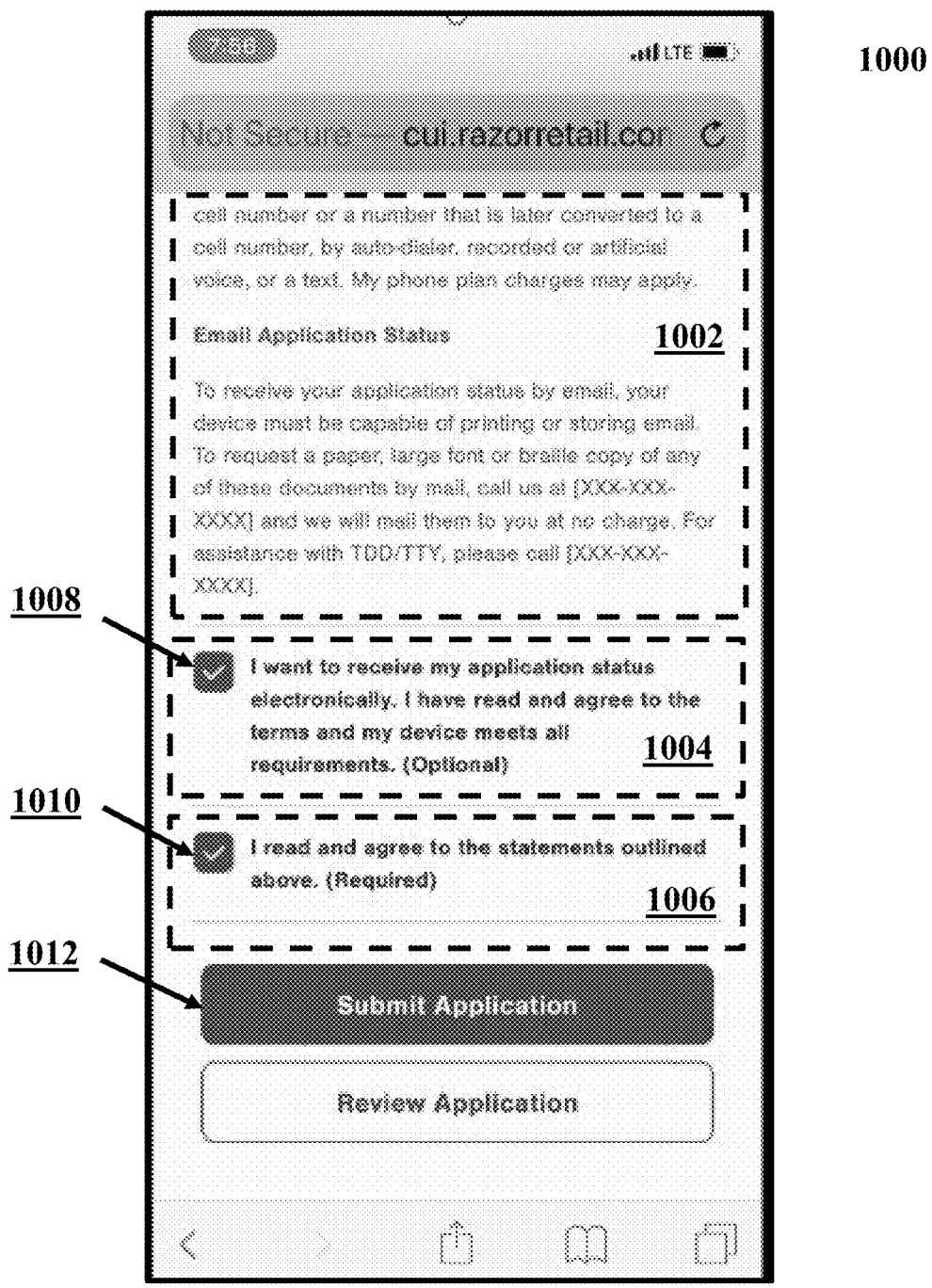

As depicted in FIG. 10, the analytics server may retrieve disclaimer language necessary with the application and may display the disclaimer language within the graphical element 1002. The disclaimer displayed within the graphical element 1002 is customizable and may be revised by the webserver of the third-party website. The disclaimer also corresponds to the application displayed throughout FIGS. 3-9. For instance, if the application requested by the user is a credit card application, the analytics server may retrieve a corresponding disclaimer (e.g., a disclaimer needed for all credit card applications and/or a disclaimer needed for that particular credit card application) and may display the disclaimer accordingly. As described throughout, the language of the disclaimer is customizable and may be revised by a system administrator or the webserver.

In some embodiments, the analytics server may also display various verification steps, as dictated by a system administrator or the webserver. Specifically, the analytics server may display graphical elements 1004 and 1006 with interactive buttons 1008 and 1010 allowing the user to confirm that he has reviewed, agrees with the disclaimer, and accepts the terms and conditions of the application. The content of the verification steps may also be inputted and/or revised by a system administrator and/or the webserver. For instance, when generating various graphical user interfaces, system administrator operating the webserver may instruct the analytics server to include various verification steps before the application is submitted. The system administrator may interact with a graphical user interface provided by the analytics server to input the content of each verification (e.g., text of the verification steps).

The analytics server may also display the interactive button 1012 that allows the user to submit his application. When the user activates/interacts with the button 1012, the analytics server may aggregate the responses inputted by the users and may transmit the user's responses to the webserver. The webserver may then analyze the user's responses and approve/deny the user's application. Upon receiving an instruction from the webserver, the analytics server may also display a notification informing the user of the application status.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method comprising:
receiving, by a server from a webserver hosting a first webpage, a request to display an electronic transaction form having a set of prompts on a user computing device;
retrieving, by the server, the set of prompts associated with the electronic transaction form;
instructing, by the server, the webserver to direct the user computing device to a second webpage;
displaying, by the server for presentation on the second webpage, a first graphical element comprising a first conversation bubble shape and containing a text string corresponding to a first prompt of the set of prompts, the first graphical element on the second webpage having a first visual attribute that matches at least one visual attribute of the first webpage;
displaying, by the server on the second webpage, a second graphical element below the first graphical element and comprising a second conversation bubble shape that contains an input element configured to receive an input from a user interacting with the webpage and a button for causing transmission of the input to the server, the second graphical element on the second webpage having a second visual attribute that matches at least one visual attribute of the first webpage;
upon the button being activated to transmit the input in the input element to the server, dynamically revising, by a server, the second graphical element by displaying the input received from the user in the place of the corresponding input element;
displaying, by the server on the second webpage, a third graphical element comprising a third conversation bubble shape and containing a second text string corresponding to a second prompt of the set of prompts, wherein the third graphical element is displayed below the second graphical element, the third graphical element on the second webpage having a third visual attribute that matches at least one visual attribute of the first webpage; and
aggregating, by the server, each input from each input element for compiling the electronic transaction form.

2. The method of claim 1, wherein the server relocates at least one of the first graphical element and the revised second graphical element.

3. The method of claim 1, wherein the server obfuscates the inputted values received from the user within the revised second graphical element.

4. The method of claim 1, wherein the revised second graphical element further comprises an interactive element configured to allow a user to edit the inputted values.

5. The method of claim 4, wherein when the user interacts with the interactive element, the server displays the at least one input element.

6. The method of claim 1, wherein aggregating each input from each input element comprises generating, by the server, an electronic file comprising each input received from the user and transmitting the electronic file to a second server.

7. The method of claim 1, wherein at least one visual attribute of at least one of the first graphical element and the second graphical element is determined by a webserver displaying the webpage.

8. The method of claim 1, wherein at least one visual attribute of at least one of the first graphical element and the second graphical element is determined by the user.

9. The method of claim 8, wherein the third graphical element is displayed within a predetermined time after the server revises the second graphical element.

10. The method of claim 1, wherein the server selects the second prompt based on an order of prompts received.

11. A system comprising:
a server comprising a processor and a non-transitory computer-readable medium containing instructions that when executed by the processor causes the processor to perform operations comprising:
receive, from a webserver hosting a first webpage, a request to display an electronic transaction form having a set of prompts on a user computing device;
retrieve the set of prompts associated with the electronic transaction form;
instruct the webserver to direct the user computing device to a second webpage;
display, for presentation on the second webpage, a first graphical element comprising a first conversation bubble shape and containing a text string corresponding to a first prompt of the set of prompts, the first graphical element on the second webpage having a first visual attribute that matches at least one visual attribute of the first webpage;
display, on the second webpage, a second graphical element below the first graphical element and comprising a second conversation bubble shape that contains an input element configured to receive an input from a user interacting with the webpage and a button for causing transmission of the input to the server, the second graphical element on the second webpage having a second visual attribute that matches at least one visual attribute of the first webpage;
upon the button being activated to transmit the input in the input element to the server, dynamically revise the second graphical element by displaying the input received from the user in the place of the corresponding input element;
display, on the second webpage, a third graphical element comprising a third conversation bubble shape and containing a second text string corresponding to a second prompt of the set of prompts, wherein the third graphical element is displayed below the second graphical element, the third graphical element on the second webpage having a third visual attribute that matches at least one visual attribute of the first webpage; and aggregate each input from each input element for compiling the electronic transaction form.

12. The system of claim 11, wherein the server relocates at least one of the first graphical element and the revised second graphical element.

13. The system of claim 11, wherein the server the server obfuscates the inputted values received from the user within the revised second graphical element.

14. The system of claim 11, wherein the revised second graphical element further comprises an interactive element configured to allow a user to edit the inputted values.

15. The system of claim 14, wherein when the user interacts with the interactive element, the server displays the at least one input element.

16. The system of claim 11, wherein aggregating each input from each input element comprises generating, by the server, an electronic file comprising each input received from the user and transmitting the electronic file to a second server.

17. The system of claim 11, wherein at least one visual attribute of at least one of the first graphical element and the second graphical element is determined by a webserver displaying the webpage.

18. The system of claim 11, wherein at least one visual attribute of at least one of the first graphical element and the second graphical element is determined by the user.

19. The system of claim 18, wherein the third graphical element is displayed within a predetermined time after the server revises the second graphical element.

20. The system of claim 11, wherein the server selects second prompt based on an order of prompts received.

* * * * *